United States Patent
Yang

[19]

[11] Patent Number: 6,053,507

[45] Date of Patent: Apr. 25, 2000

[54] CHUCK ASSEMBLY FOR A TOOL BIT

[76] Inventor: Tsung-Hsun Yang, No. 167, Yung-Feng Rd., Tai-Ping City, Taichung Hsien, Taiwan

[21] Appl. No.: 09/124,004

[22] Filed: Jul. 29, 1998

[51] Int. Cl.[7] ................................................ B23B 31/12
[52] U.S. Cl. ............................................. 279/62; 279/902
[58] Field of Search .............................. 279/60–65, 902, 279/123

[56] References Cited

U.S. PATENT DOCUMENTS

| | | | |
|---|---|---|---|
| 661,382 | 11/1900 | Noll .......................................... | 279/62 |
| 768,396 | 8/1904 | North ........................................ | 279/62 |
| 845,773 | 3/1907 | Gauss ....................................... | 279/62 |
| 872,841 | 12/1907 | North ........................................ | 279/62 |
| 5,348,317 | 9/1994 | Steadings et al. ......................... | 279/62 |
| 5,918,887 | 7/1999 | Miles ........................................ | 279/62 |

FOREIGN PATENT DOCUMENTS

| | | | |
|---|---|---|---|
| 131455 | 2/1951 | Sweden .................................... | 279/62 |

Primary Examiner—Steven C. Bishop
Attorney, Agent, or Firm—Foley & Lardner

[57] ABSTRACT

A chuck assembly includes a hollow cylindrical chuck body having a surrounding wall that confines a receiving chamber adapted for receiving a tool bit, and that is formed with a plurality of angularly spaced inclined guiding channels which converge in a direction toward the front end and which are communicated with the receiving chamber. Each of the guiding channels has a rectangular cross-section. The surrounding wall is further formed with an annular retaining groove for accessing the guiding channels. A plurality of clamping members are received slidably and respectively in the guiding channels. Each of the clamping members has a cross-section corresponding to that of the respective one of the guiding channels, and an outer side surface formed with an external thread. A drive ring is provided rotatably in the retaining groove, and has an inclined inner surface formed with an internal thread for meshing with the external threads of the clamping members. Rotation of the drive ring relative to the chuck body results in linear movement of the clamping members in the guiding channels to clamp or loosen the tool bit that is extended into the receiving chamber.

4 Claims, 6 Drawing Sheets

CHUCK ASSEMBLY FOR A TOOL BIT

BACKGROUND OF THE INVENTION

1. Field of the Invention

This invention relates to a chuck assembly, more particularly to a chuck assembly which is easy to fabricate and convenient to operate.

2. Description of the Related Art

FIG. 1 illustrates a conventional chuck assembly 10 for holding a tool bit, such as a drill bit 11. After the drill bit 11 is inserted into the chuck assembly 10 for operation or when the drill bit 11 is to be removed from the chuck assembly 10 for replacement, a chuck key 12 with a rotary gear must be operated to tighten or loosen the drill bit 11. Operation of the chuck assembly 10 is therefore inconvenient and unsatisfactory.

Referring to FIG. 2, another conventional chuck assembly 20 is shown to include a chuck body 21, a drive ring 22, and a plurality of clamping pieces 23. The chuck body 21 is formed with an insert hole 211 at a front end thereof for receiving a section of a tool bit, such as a drill bit 212. The chuck body 21 is further formed with a plurality of inclined elongated guiding channels 213 which extend from a rear end of the chuck body 21 to the front end, and which converge forwardly to communicate with the insert hole 211. Each of the guiding channels 213 has a generally circular cross-section. The clamping pieces 23 are received in the guiding channels 213, respectively. Each of the clamping pieces 23 has a rear section with a generally semi-circular cross-section and an outer side surface formed with an external thread 231. The chuck body 21 is further formed with an annular peripheral groove 214 for accessing the guiding channels 213. The drive ring 22 is received rotatably in the peripheral groove 214 of the chuck body 21, and is formed from two complementary ring parts. The drive ring 22 has an inner surface formed with an internal thread 221 for meshing with the external threads 231 of the clamping pieces 23. Accordingly, by rotating the drive ring 22, the clamping pieces 23 are movable forwardly and rearwardly in the guiding channels 213 by virtue of the engagement between the internal thread 221 of the drive ring 22 and the external threads 231 of the clamping pieces 23 in order to loosen or tighten the drill bit 212.

The conventional chuck assembly 20 suffers from the following drawbacks:

1. Since the clamping pieces 23 are slidable within the guiding channels 213, and since the clamping pieces 23 have curved outer surfaces to conform with the curved inner surfaces of the guiding channels 213, the cross-section of each of the guiding channels 213 is slightly larger than a largest cross-section of the respective one of the clamping pieces 23 in order to permit smooth movement of the clamping piece 23 along the guiding hole 213. As such, when the drill bit 212 is clamped by the clamping pieces 231, and when the chuck body 21 is rotated axially with a relatively high speed while working on a work piece (not shown), undesired movement or axial rotation of the clamping pieces 23 in the guiding channels 213 will result since the outer surfaces of the clamping pieces 23 are not restricted by the inner surfaces of the guiding channels 213. This may prevent the clamping pieces 23 from meshing precisely with the drive ring 22 and can cause damage to the clamping pieces 23 and to the external threads 231 formed on the clamping pieces 23.

2. Formation of the guiding channels 213 that have curved and smooth inner surfaces, and of the clamping pieces 23 that have curved and smooth outer surfaces involve relatively complicated manufacturing and processing steps. Therefore, the chuck assembly 20 is relatively costly to fabricate.

SUMMARY OF THE INVENTION

The object of the present invention is to provide a chuck assembly which is easy to fabricate and convenient to operate.

Accordingly, the chuck assembly of the present invention includes a hollow cylindrical chuck body, a plurality of clamping members, and a drive ring. The chuck body has front and rear ends, and a surrounding wall that confines a receiving chamber which opens at the front end and which is adapted for receiving one end of a tool bit. The surrounding wall is formed with a plurality of angularly spaced inclined guiding channels which extend from the rear end toward the front end, which converge in a direction toward the front end, and which are communicated with the receiving chamber at the front end. Each of the guiding channels has a substantially rectangular cross-section. The surrounding wall has an outer surface formed with an annular retaining groove for accessing the guiding channels. The clamping members are received slidably and respectively in the guiding channels. Each of the clamping members has a cross-section corresponding to that of the respective one of the guiding channels, and an outer side surface formed with an external thread. The drive ring is provided rotatably in the retaining groove of the chuck body, and has an inclined inner surface formed with an internal thread for meshing with the external threads of the clamping members. Rotation of the drive ring relative to the chuck body results in linear movement of the clamping members in the guiding channels to clamp or loosen the tool bit that is extended into the receiving chamber.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
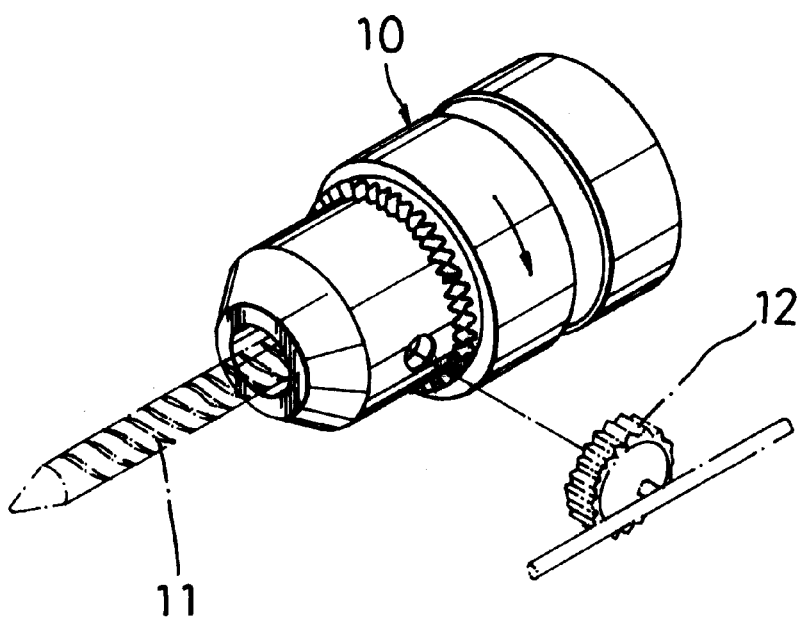
FIG. 1 is a perspective view of a conventional chuck assembly.
Figure 2:
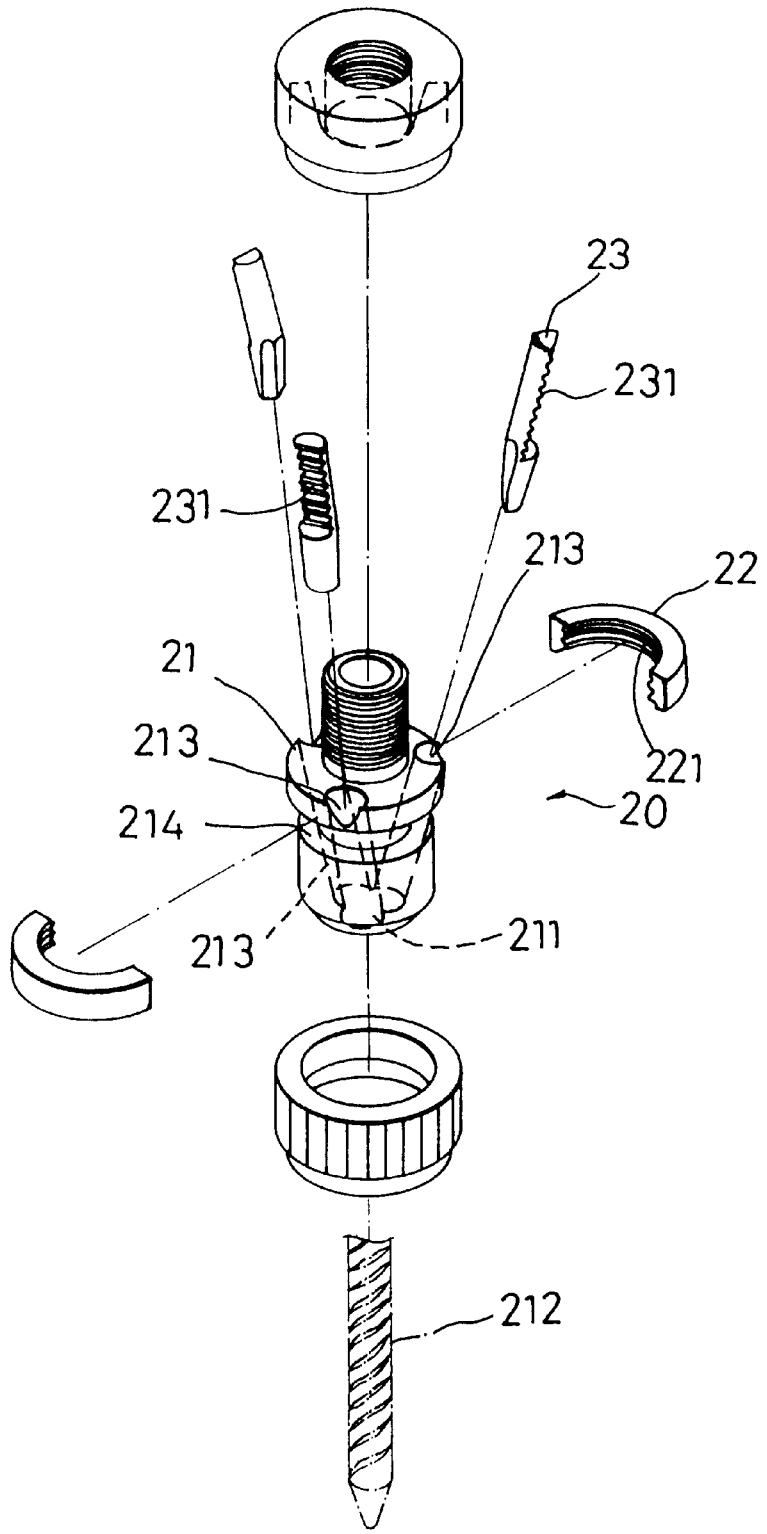
FIG. 2 is an exploded perspective view of another conventional chuck assembly.
Figure 3:
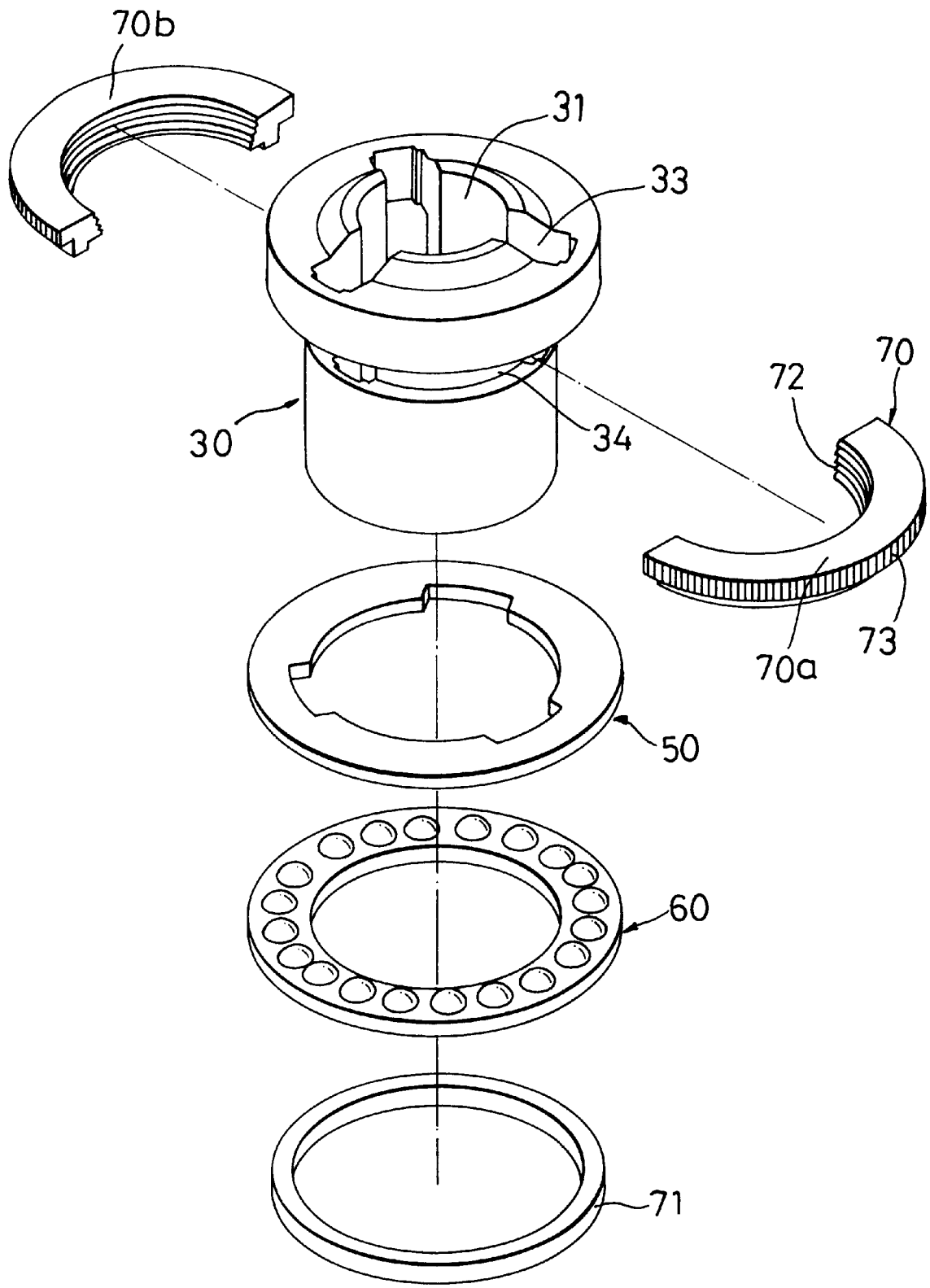
FIG. 3 is a partly exploded perspective view of a preferred embodiment of a chuck assembly according to the present invention.
Figure 4:
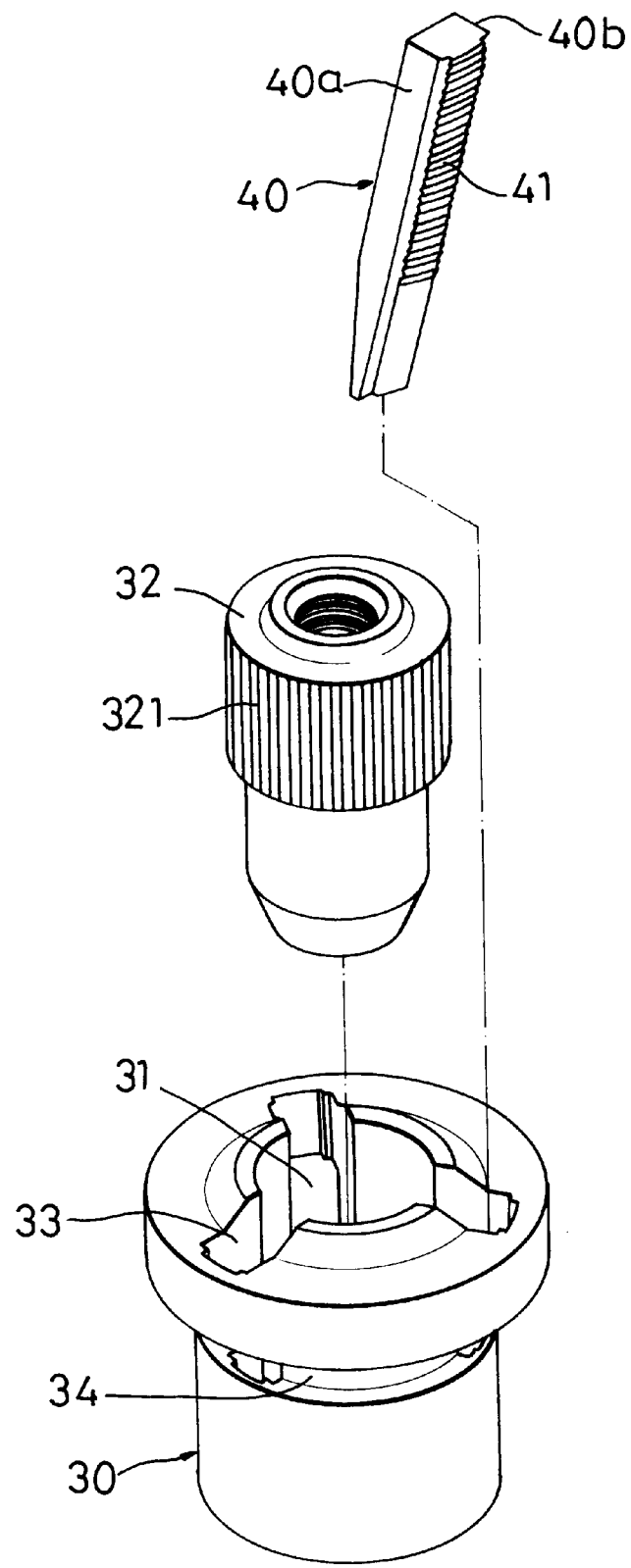
FIG. 4 is another partly exploded perspective view of the preferred embodiment.
Figure 5:
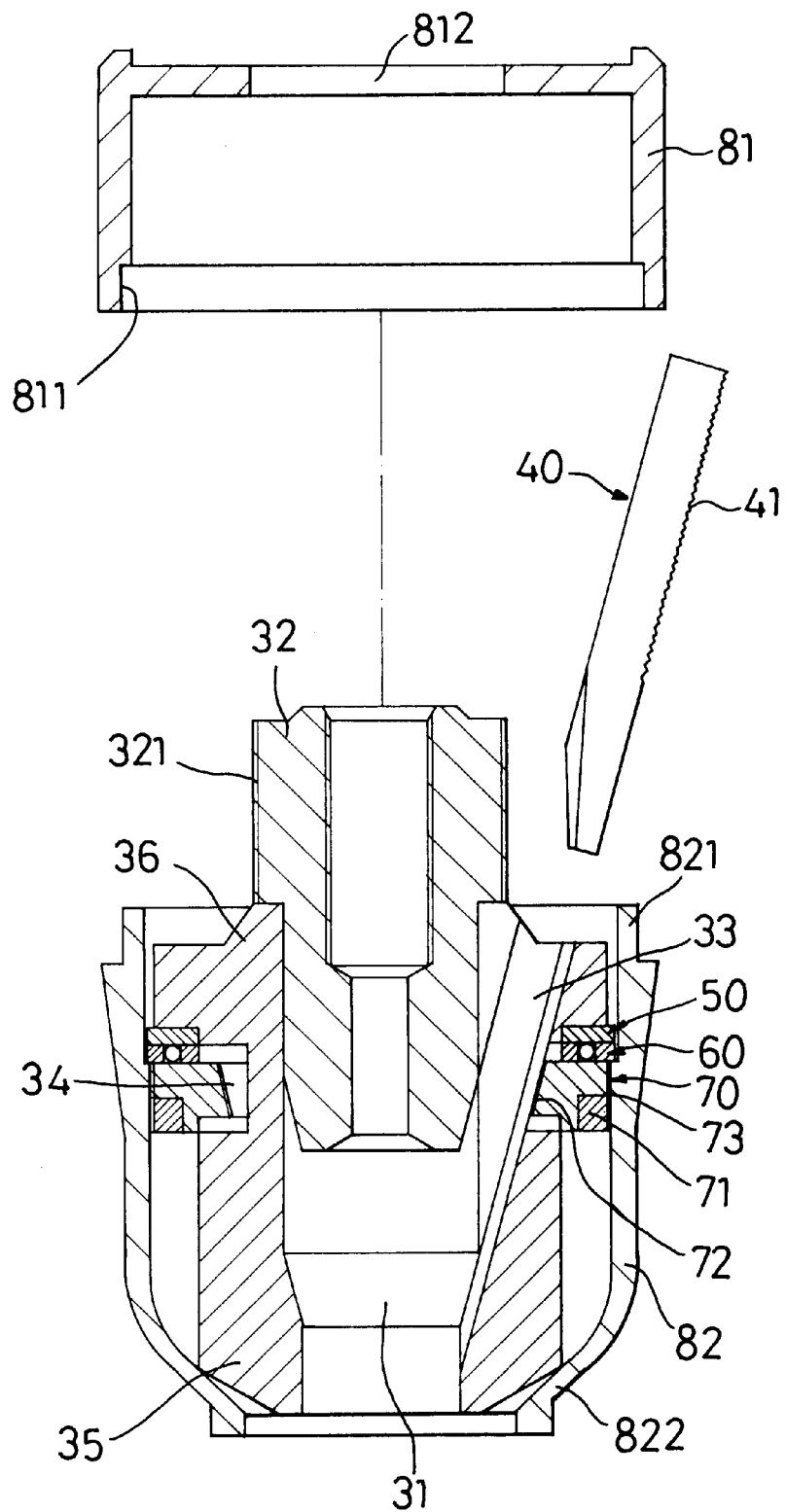
FIG. 5 is a partly exploded vertical sectional view of the preferred embodiment.

Referring to FIGS. 3 to 5, the preferred embodiment of the chuck assembly of this invention is shown to include a chuck body 30, a coupling member 32, a fixing ring 50, an annular ball bearing 60, a drive ring 70, three clamping members 40 (only one is shown), and front and rear housing parts 82, 81.

The chuck body 30 is formed as a generally cylindrical hollow body, and has a surrounding wall with an inner surface that confines an axial receiving chamber 31 which extends from a front end 35 of the chuck body 30 to a rear end 36 of the same. The receiving chamber 31 opens at the front end 35 and is adapted for receiving one end of a tool bit 90 (see FIG. 6). The inner surface of the surrounding wall is formed with three angularly spaced, inclined guiding channels 33 which extend from the rear end 36 toward the front end 35, which are communicated with the receiving chamber 31, and which converge in a direction toward the front end 35 of the chuck body 30. Each of the guiding channels 33 has a generally rectangular cross-section. The surrounding wall has an outer surface formed with an annular retaining groove 34 therearound. The annular retaining groove 34 extends into the guiding channels 33 for accessing the latter.

The coupling member 32 is fitted into the receiving chamber 31 at the rear end 36 of the chuck body 30, and is secured to the chuck body 30. The coupling member 32 is adapted for coupling the chuck body 30 to a rotary driving device (not shown) in a conventional manner. As shown, the coupling member 32 has a section which projects from the rear end 36 of the chuck body 30 and which has a teethed outer surface 321.

The clamping members 40 are received slidably and respectively in the guiding channels 33 of the chuck body 30. Each of the clamping members 40 has a generally rectangular cross-section conforming with the respective one of the guiding channels 33, and an outer side surface formed with an external thread 41.

The drive ring 70 is disposed in the retaining groove 34 of the chuck body 30, and includes two complementary ring parts 70a, 70b, and an annular sleeve 71 for joining together the ring parts 70a, 70b. The drive ring 70 has an inclined inner surface formed with an internal thread 72 for meshing with the external threads 41 of the clamping members 40, and a teethed outer surface 73.

The fixing ring 50 and the ball bearing 60 are received in the retaining groove 34 of the chuck body 30. As shown, the ball bearing 60 is in contact with the rings 70, 50. The ball bearing 60 and the fixing ring 50 cooperatively serve as bearing means to mount the drive ring 70 rotatably to the chuck body 30.

The front housing part 82 is disposed around the chuck body 30, and has an open front end 822 formed around a front opening of the receiving chamber 31, and a rear end formed with an annular coupling rim 821. The front end 35 of the chuck body 30 abuts against the front end 822 of the front housing part 82. The front housing part 82 has an inner surface which engages the teethed outer surface 73 of the drive ring 70.

The rear housing part 81 is disposed around the coupling member 32, and has a front end formed with an annular recess 811 to receive the annular rim 821 so as to couple rotatably the rear housing part 81 to the front housing part 82. The rear housing part 81 has a rear end wall formed with an opening 812 which permits extension of the coupling member 32 therethrough. An inner surface of the rear end wall of the rear housing part 81 that confines the opening 812 engages the teethed outer surface 321 of the coupling member 32.

Assembly of the preferred embodiment is conducted in the following manner: Initially, the clamping members 40 are extended into the guiding channels 33 of the chuck body 30, respectively, so that the outer side surfaces that are formed with the external threads 41 are exposed via the retaining groove 34 in the chuck body 30. Then, the fixing ring 50, the ball bearing 60, and the ring parts 70a, 70b of the drive ring 70 are disposed in the retaining groove 34 so that the ring parts 70a, 70b are in contact with the ball bearing 60 and so that the internal thread 72 meshes with the external threads 41 of the clamping members 40. The annular sleeve 71 is sleeved around the ring parts 70a, 70b to join together the latter. Thereafter, the front housing part 82 is sleeved onto the chuck body 30 from the front end 35 until the front end 35 abuts against the front end 822 of the front housing part 82 and until the inner surface of the front housing part 82 engages the teethed outer surface 73 of the drive ring 70. The rear housing part 81 is sleeved onto the coupling member 32 so that the periphery of the opening 812 engages the teethed outer surface 321 of the coupling member 32 and so that the annular rim 821 of the front housing part 82 extends into the annular recess 811 of the rear housing part 81. Assembly of the preferred embodiment is completed at this time.

Figure 6:
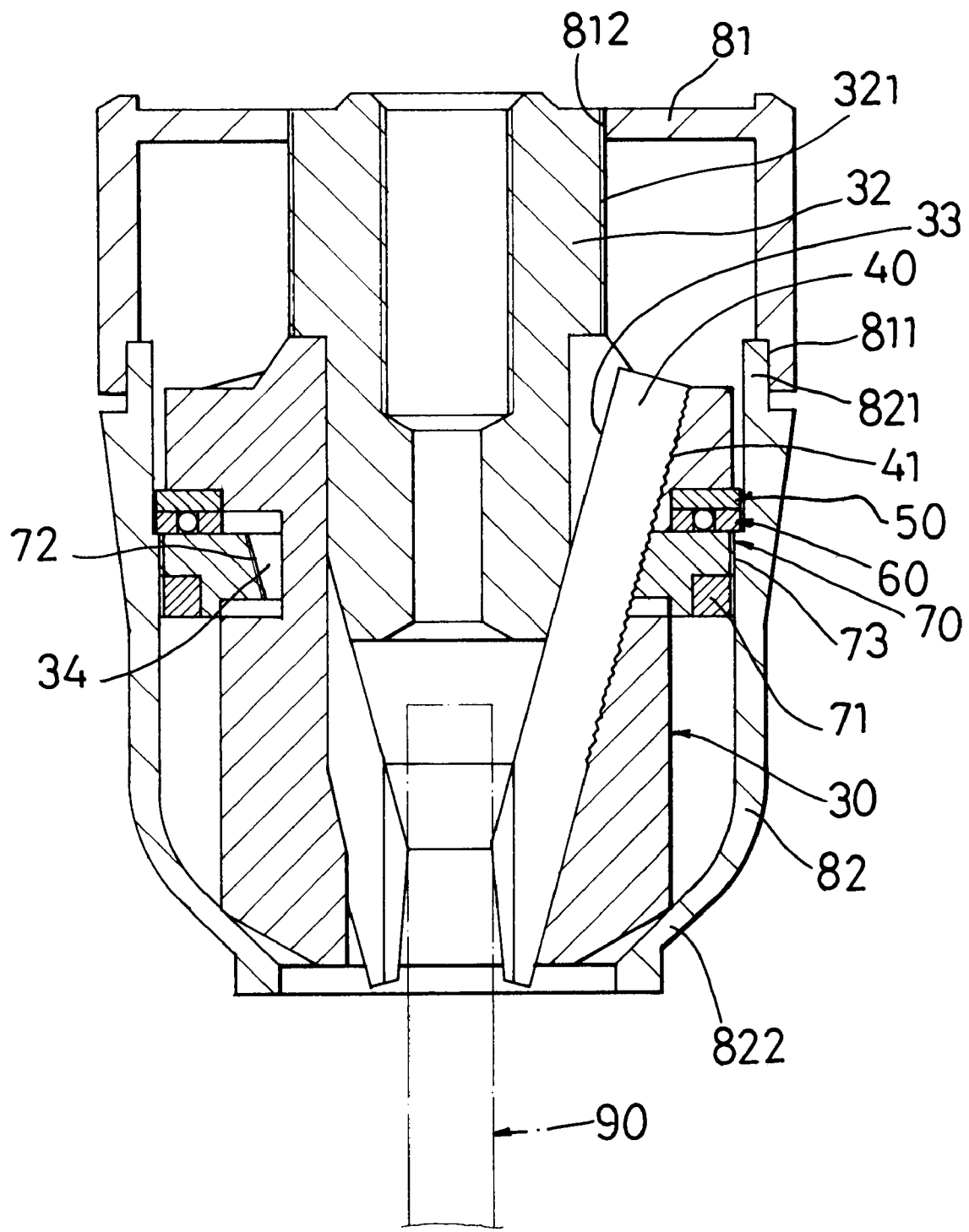
FIG. 6 is a vertical sectional view of the preferred embodiment in an assembled state.

Referring to FIG. 6, in use, the tool bit 90 is extended into the receiving chamber 31 from the front end 35 of the chuck body 30. When it is desired to clamp tightly the tool bit 90 for operation, the front housing part 82 is rotated for rotating the drive ring 70 therewith. Due to the engagement between the internal thread 72 of the drive ring 70 and the external threads 41 of the clamping members 40, rotation of the drive ring 70 in a first direction results in linear and forward movement of the clamping members 40 in the guiding channels 33 to clamp the tool bit 90. Accordingly, when it is desired to loosen the tool bit 90, such as for replacement, the front housing part 82 is rotated in a second direction opposite to the first direction to result in linear and rearward movement of the clamping members 40, thereby loosening the tool bit 90.

The advantages provided by the chuck assembly of the present invention are as follows:

1. Since the guiding channels 33 and the clamping members 40 have rectangular cross-sections, each of the clamping members 40 has two opposite side walls 40a, 40b (see FIG. 4) which are restricted by inner walls of the respective guiding channel 33. As such, when the tool bit 90 is clamped by the clamping members 40, and when the chuck body 30 is rotated axially with a relatively high speed while working on a work piece (not shown), undesired movement or axial rotation of the clamping members 40 will not occur. Damage to the clamping members 40 can thus be prevented.

2. The chuck body 30, which is formed with the axial receiving chamber 31 and the guiding channels 33 communicating with the receiving chamber 31, can be formed by casting via a powder metallurgy process with the use of a mold. By employing the powder metallurgy process, the inner surfaces of the guiding channels 33 can be readily formed to be relatively smooth without the need for further processing. In addition, formation of the clamping members 40 as elongated bodies with rectangular cross-sections can be accomplished simply by cutting, and is easier to conduct than the formation of the conventional clamping pieces with semi-circular cross-sections. The chuck assembly of the present invention is thus more economical to fabricate than the conventional chuck assembly 20 described beforehand.

With this invention thus explained, it is apparent that numerous modifications and variations can be made without departing from the scope and spirit of this invention. It is therefore intended that this invention be limited only as indicated in the appended claims.

I claim:

1. A chuck assembly for a tool bit, comprising:

a hollow cylindrical chuck body having a front end, a rear end, and a surrounding wall having an inner surface defining a receiving chamber which opens at said front end and which is adapted for receiving one end of the tool bit, said inner surface being formed with a plurality of angularly spaced inclined guiding channels which extend from said rear end toward said front end and which converge in a direction toward said front end, each of said guiding channels having a substantially rectangular cross-section, said surrounding wall having an outer surface formed with an annular retaining groove accessing said guiding channels;

a plurality of clamping members received slidably and respectively in said guiding channels, each of said clamping members having a cross-section corresponding to that of the respective one of said guiding channels, and an outer side surface formed with an external thread; and a drive ring provided rotatably in said retaining groove of said chuck body and having an inclined inner surface formed with an internal thread meshing with said external threads of said clamping members;

whereby, rotation of said drive ring relative to said chuck body results in linear movement of said clamping members in said guiding channels, said linear movement being adapted for clamping or loosening the tool bit received in said receiving chamber.

2. The chuck assembly according to claim 1, further comprising a bearing in said retaining groove of said chuck body rotatably mounting said drive ring with respect to said main body.

3. The chuck assembly according to claim 2, wherein said drive ring includes two complementary ring parts, and an annular sleeve joining together said complementary ring parts.

4. The chuck assembly according to claim 1, further comprising:

a coupling member mounted coaxially on said rear end of said chuck body;

a front housing part disposed around said chuck body and having an open front end, said front end of said chuck body abutting against said front end of said front housing part, said front housing part having an inner surface engaging said drive ring to rotate said drive ring with said front housing part; and a rear housing part disposed around said coupling member and coupled rotatably to said front housing part, said rear housing part having an inner surface engaging said coupling member.

\* \* \* \* \*